June 22, 1943.  F. J. MILLER  2,322,536
SINKER RELEASING DEVICES
Filed Jan. 6, 1942
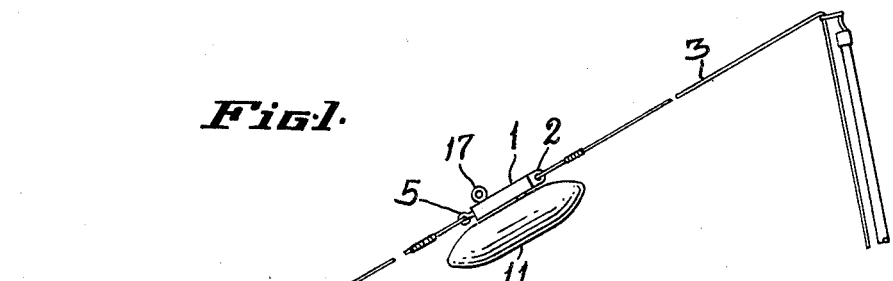
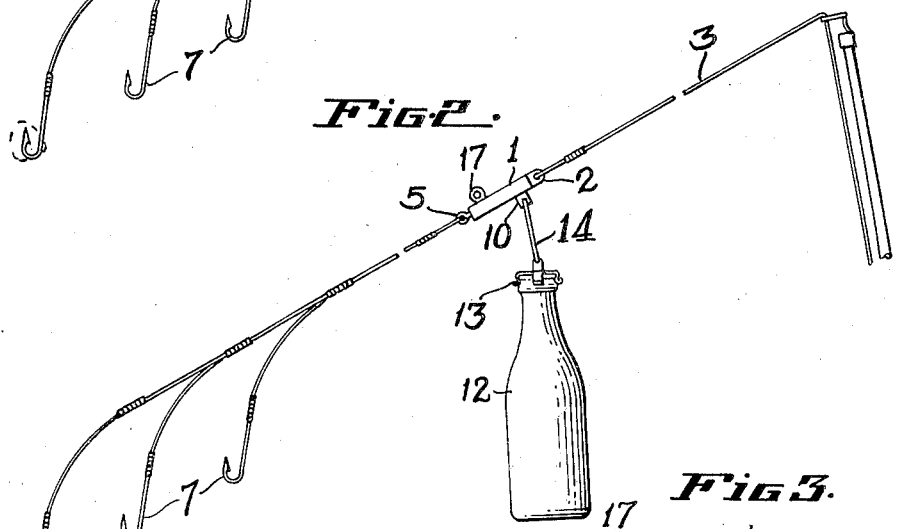
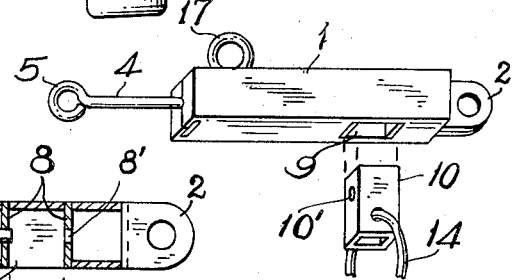
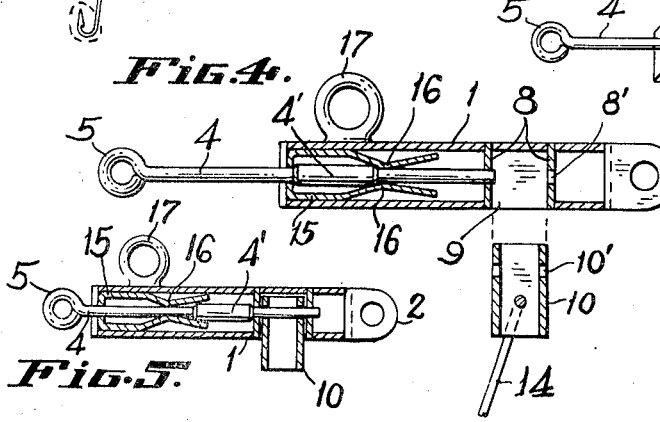
INVENTOR.
FRED J. MILLER
BY J. E. Trabucco
ATTORNEY.

Patented June 22, 1943

2,322,536

UNITED STATES PATENT OFFICE 2,322,536

SINKER RELEASING DEVICE

Fred J. Miller, San Francisco, Calif.

Application January 6, 1942, Serial No. 425,793

4 Claims. (Cl. 43—28)

This invention relates to a sinker releasing device for use with fishing tackle.

An object of my invention is to provide a sinker release which permits the detachment of the sinker from a fishing line when a fish is caught and the fisherman desires the pleasure of playing the fish without the weight and encumbrance of the sinker.

Another object of my invention is to provide an improved sinker release of the kind characterized having means permitting the use of an inexpensive sinker, which, when released will entail the loss of but a fraction of the cost of a metal sinker of the kind now commonly used.

In the accompanying drawing:

Fig. 1 is a diagrammatic illustration showing my invention used with a streamlined sinker;

Fig. 2 is a similar view showing a bottle used as a sinker;

Fig. 3 is a perspective view of my improved sinker releasing device, showing the releasable member in a detached or released position;

Fig. 4 is an enlarged longitudinal sectional view of the sinker releasing device with the parts shown in released positions; and Fig. 5 is a longitudinal sectional view of the device with the parts shown in an assembled position.

Referring to the drawing, the numeral 1 designates an elongated casing which is preferably rectangular or square shaped in cross section. The casing is entirely closed, and at one end thereof a projecting member 2 is formed having an eyelet therein for the attachment of a fishing line 3. The opposite end of the casing has a suitable opening through which a rod 4 slidably extends. The rod 4 is provided with an eye 5 to which a leader 6 carrying a number of hooks 7, is fastened. The opposite end of the rod is adapted to extend through holes 8′ provided in two spaced walls or partitions 8, the said walls or partitions extending transversely across the interior of the casing. The underneath side wall of the casing is cut away at points between the partitions 8 to provide a substantially square-shaped opening 9 for the positioning of a square-shaped tubular block 10. The block 10 has aligned openings 10′ through which the rod 4 is adapted to extend when the block is positioned with its said holes in alignment with the holes 8′ of the partitions 8. When in such a position the block and the sinker it carries are held in an attached position with respect to the casing. The block 10 serves as means for detachably connecting a sinker to the casing 1, and as shown in Fig. 1 the sinker 11 may be formed with pointed ends so that when trolling, the water in front of the hooks will not be unduly disturbed. The sinker 11 is preferably secured directly to the block 10, and when a fish is caught and the block is released by the withdrawal of the rod 4 from the aligned openings in the said block and in the partitions 8, the said sinker and the block will become detached from the casing and fall to the bottom of the body of water wherein the fishing operation is being carried on, thereby permitting the fisherman to play the fish without the weight or incumbrance of the sinker. As shown in Figs. 2, 3 and 4, a sinker 12 may be in the form of a weighted bottle which is attached to the block 10 by means of a cap 13 and a connecting link 14. The bottle being somewhat streamlined will, when weighted down with shot or other heavy material, serve very satisfactorily as a sinker. When it is detached from the line, the loss will not be of any particular consequence from a monetary standpoint.

Located inside the casing is a generally U-shaped member 15 made preferably from flexible metal such as copper, brass, or rustproof steel, having an opening in its central part and substantially parallel legs which are formed with inwardly protruding parts 16. The central part of the U-shaped member 15 is suitably secured at an end of the casing so as to prevent its displacement. The rod 4 slidably extends through the hole in the central part of the U-shaped member 15. The rod is provided with an enlarged section 4′ which is so placed that when the said rod is positioned with its inwardly disposed end projecting through the aligned holes in the partitions 8 and the block 10, the protruding parts 16 of the U-shaped member engage with the outward end of the said enlarged section and thereby normally prevent the movement of the said rod relative to the block 10 which it then supports. The U-shaped member 15 is preferably made so that its opposed legs will separate and release its protruding parts 16 from the then engaging end of the enlarged section 4′ of the rod 4 when a predetermined pull is given to the latter. A fish caught on one of the hooks 7 if above a certain weight will exert a sufficient pull upon the rod 4 to effect the release of the then engaging end of the enlarged section 4′ from the inwardly protruding parts 16 of the legs of the U-shaped member 15. In such an event the rod 4 will be pulled outwardly to a position whereby the block 10 is released, and the latter, together with its associated sinker will become detached from the casing 1. The enlarged part 4' being larger than the openings in the end of the casing and the U-shaped member will not be permitted to become entirely detached from the said casing. The attachment of another block 10 to the casing may be effected by pressing the protruding end of the rod 4 inwardly until the rod is in a position where it extends through the aligned holes in the said block and the partitions 8. When so moved the enlarged section 4' of the rod will first separate the inwardly protruding parts 16 of the legs of the U-shaped member 15 sufficiently to allow the said enlarged section to ride past them, and finally, when the said rod reaches the extent of its inward movement the enlarged section 4' will have become positioned with its outwardly disposed end in an engaging position with the said inwardly protruding members.

The casing 1 is provided with an eyelet 17 to which may be attached the leader 6 when it is not desired that the weighted sinker and its associated block 10 be released upon the catching of a fish. When the leader is secured directly to the eyelet 17 rather than to the rod 4 the sinker will not be released.

Having described my invention, what I claim is:

1. A sinker releasing device comprising a casing having a line attaching means at one end and a rod opening at its opposite end, a reciprocable rod extending into the casing, having line attaching means located exteriorly of the casing, a releasable member engageable by and adapted to be connected to the casing by the rod when the latter is substantially at one extreme of its reciprocatory movement, yieldable means in the casing for engaging with the rod and normally holding the latter in a position whereby the releasable member is held in a connected position with respect to the casing, the said rod when a predetermined pull is exerted thereon being releasable from the yieldable means, whereby the said rod may be moved to release the releasable member, and a sinker carried by the releasable member.

2. A sinker releasing device comprising a body provided with a line attaching means, a releasable member connected to the body, a sinker carried by the releasable member, and means carried by the body for connecting the releasable member to the body, the said means being normally connected to a fishing line having a hook thereon, and the said means being so constructed and arranged as to be moved to a position whereby the releasable member and the sinker are disconnected from the body when a predetermined pull is exerted in a certain direction on the line attached thereto.

3. A sinker releasing device, a casing having line attaching means at one end and an opening in its opposite end, a reciprocable member extending through the end opening in the casing, having line attaching means located thereon exteriorly of the casing, a releasable member engaged and supported by the rod when the latter is substantially at one extreme of its reciprocatory movement, a sinker carried by the releasable member, and means carried by the casing for releasably holding the rod in a position whereby the releasable member is supported thereby, the said means being adapted to allow the rod to be moved when a predetermined pull is exerted thereon to a position where it no longer supports the releasable member and the sinker.

4. In a sinker releasing device, a body having line attaching means at one end, a releasable member normally connected to the body, a sinker carried by the releasable member, a movable device for releasably connecting the releasable member to the body, having line attaching means thereon, and yieldable means engaging with the movable device for holding it in a position whereby the releasable member is connected to the body, the said yieldable means being adapted to permit the movable device to be moved to a position whereby the releasable member is disconnected from the body when a predetermined pull in a certain direction is exerted on the said movable device.

FRED J. MILLER.